United States Patent Office 2,916,418
Patented Dec. 8, 1959

2,916,418

STABLE KALLIKREIN PREPARATIONS

Heinrich Kraut and Willy Körbel, Dortmund, Germany, assignors to Farbenfabriken Bayer Aktiengesellschaft, Leverkusen, Germany, a corporation of Germany No Drawing. Application May 28, 1956
Serial No. 587,472

Claims priority, application Germany June 14, 1955

8 Claims. (Cl. 167—74)

The present invention relates to stable preparations of the circulatory hormone kallikrein and more particularly to a biologically inactive compound of kallikrein and an inactivator therefor.

Like many biologically active substances obtained from animal organs, kallikrein from pancreas is unstable in aqueous solution. The only known manner to produce stable preparations consists in the drying of kallikrein solutions. For many therapeutical applications, including injection, it is of importance to have a storable solution, which is ready for use at any time. It is therefore an object of the present invention to provide a storable preparation containing the circulatory hormone kallikrein, which is stable in solution and in the dry state.

A further object is the provision of a kallikrein compound having prolonged circulatory hormone activity.

Further objects will appear hereinafter.

We have found that kallikrein solutions, which contain the inactivator of kallikrein from organs of cattle are capable of being fully reactivated even after storing for several months at room temperature. Both active components react with each other and form a biologically inactive compound.

Since the human body is capable of freeing kallikrein from this inactive compound, stable solutions may be obtained in this manner which are capable of being employed for therapeutical purpose, especially for intravaneous injection. Before use these solutions must be adjusted to a pH of 7 to 8 and rendered sterile.

For the production of dry preparations the water is removed in a known manner, for instance by freeze drying.

Example 1

10,000 kallikrein units of a degree of purity suitable for injection and 20,000 units of the inactivator obtainable according to the method described in our copending application Serial No. 511,765 for a Kallikrein Inactivator, filed May 27, 1955, are dissolved in 50 cc. of isotonic solution and adjusted to a pH of 7.5. The solution is subjected to sterile filtration and then filled into ampoules under sterile conditions.

Example 2

10,000 kallikrein units of a degree of purity suitable for injection and 20,000 units of the inactivator obtained as in Example 1, are dissolved in some water and adjusted to a pH of 7.5 by addition of sodium bicarbonate. The solution is subjected to sterile filtration and filled into glass vessels containing 100 kallikrein units and 200 units of the inactivator each. The water is then removed by freeze drying and the glass vessels containing the dry preparations closed under sterile conditions.

We claim:

1. Process for the production of stable kallikrein preparations having prolonged activity which comprises reacting kallikrein in aqueous solution with at least an equal amount in units of kallikrein inactivator from cattle organs, said amount of kallikrein inactivator being at least sufficient to inactivate the kallikrein and sterilizing the solution.

2. Process according to claim 1 in which the proportion of units of kallikrein to units of kallikrein inactivator present is about 1:2.

3. A sterile, stable solution of the circulatory hormone kallikrein containing kallikrein and at least an equal amount of units of kallikrein inactivator, said amount of kallikrein inactivator being at least sufficient to inactivate said kallikrein.

4. A sterile, stable solution according to claim 3 in which the proportion of units of kallikrein to units of kallikrein inactivator present in said solution is 1:2.

5. A sealed container containing a sterile, stable solution of the circulatory hormone kallikrein containing kallikrein and at least an equal amount of units of kallikrein inactivator, said amount of kallikrein inactivator being at least sufficient to inactivate said kallikrein.

6. A sealed container containing a sterile, stable solution according to claim 3 in which the proportion of units of kallikrein to units of kallikrein inactivator present in said solution is 1:2.

7. A sterile, stable compound of the circulatory hormone kallikrein containing kallikrein and at least an equal amount of units of kallikrein inactivator, said amount being at least sufficient to inactivate said kallikrein.

8. A sterile, stable compound according to claim 7 in which the proportion of units of kallikrein to units of kallikrein inactivator present in said compound is 1:2.

References Cited in the file of this patent

Werle: Chem. Abst., vol. 48, 1954, p. 11,509–A.
Werle: Chem. Abst., vol. 45, 1951, p. 7173–C.
Werle et al.: Biochem. Zeit., vol. 321, pp. 372–376 (1951).
Gardner: The Am. J. of Physiology, vol. 142, No. 4, November 1944, pp. 541–543.
Freezing and Drying, Harris, 1951, pp. 23–25.